United States Patent
Imaizumi et al.

(10) Patent No.: US 6,651,526 B1
(45) Date of Patent: Nov. 25, 2003

(54) STEERING WHEEL AND MANUFACTURING METHOD THEREFOR

(75) Inventors: Tadashi Imaizumi, Hamamatsu (JP); Seiya Nishimura, Hamamatsu (JP); Toru Makino, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/654,726

(22) Filed: Sep. 5, 2000

(30) Foreign Application Priority Data

Sep. 6, 1999 (JP) .............................. 11-252311

(51) Int. Cl.⁷ .............................................. B62D 1/04
(52) U.S. Cl. ................................... 74/552; 74/558
(58) Field of Search ...................... 74/552, 558, 523; 16/430

(56) References Cited

U.S. PATENT DOCUMENTS

| | | | |
|---|---|---|---|
| 3,530,739 A | * 9/1970 | Meier | 74/552 |
| 3,576,141 A | * 4/1971 | Brilmyer | 74/552 |
| 3,802,291 A | * 4/1974 | Young, Jr. et al. | 74/552 |
| 4,824,873 A | * 4/1989 | Ushida et al. | 521/137 |
| 5,123,296 A | * 6/1992 | Chang | 74/502.2 |
| 5,299,475 A | * 4/1994 | Stroop | 16/430 |
| 5,305,655 A | * 4/1994 | Kaga | 74/552 |
| 6,065,366 A | * 5/2000 | Koyama et al. | 74/552 |

FOREIGN PATENT DOCUMENTS

| | | | |
|---|---|---|---|
| GB | 2 142 299 A | * 1/1985 | ............ B62D/1/04 |
| JP | 51-28619 | 8/1949 | |
| JP | 52-100629 | 1/1951 | |
| JP | 57-010969 | 6/1955 | |
| JP | 58-076255 | 5/1983 | |
| JP | 63-176773 | 7/1988 | |
| JP | 05-056737 | 7/1993 | |
| JP | 5-178216 | 7/1993 | |
| JP | 6-170882 | 6/1994 | |
| JP | 11-34881 | 2/1999 | |

OTHER PUBLICATIONS

Japanese Office Action dated Feb. 5, 2002 (w/English translation of the relevant portion).

* cited by examiner

*Primary Examiner*—David A. Bucci
*Assistant Examiner*—Timothy McAnulty
(74) *Attorney, Agent, or Firm*—Dickstein, Shapiro, Morin & Oshinsky, LLP

(57) ABSTRACT

A steering wheel is manufactured by making a steering wheel core member by forming a first resin layer about a metal core bar, and then attaching outer parts to the outside of this core member.

9 Claims, 5 Drawing Sheets

STEERING WHEEL AND MANUFACTURING METHOD THEREFOR

BACKGROUND OF THE INVENTION

1. Field of the Invention

The present invention relates to an automobile steering wheel and a manufacturing method therefore. More specifically, the present invention aims to improve the accuracy of the final product's shape and to simplify the manufacturing steps therefore by employing for the steering wheel core member an arrangement in which a first resin layer is formed about a metal core bar.

This application is based on patent application No. Hei 11-252311 filed in Japan, the content of which is incorporated herein by reference.

2. Description of the Related Art

Automobile steering wheels are available in a number of design variations, and may be manufactured by numerous methods. Basically, however, the method employed is one in which an outer shell, consisting of resin, wood, leather or the like, is formed around a metal core bar consisting of a metal material.

The metal core bar is formed using a metal pipe for example, and by welding together the rim, spokes and other parts into an assembly. Deformations in the metal core bar can readily occur during the welding process, however, with the rim being particularly prone to distortion.

When forming the outer shell by adhering a member to the metal core bar, deformities in the metal core bar can affect the outer shape of the steering wheel. As a result, accuracy in the shape of the final product is impaired.

Figure 7A:
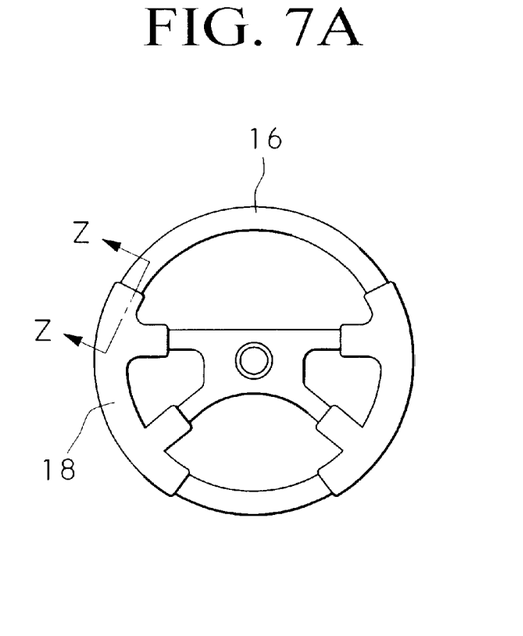
FIG. 7A is a planar view of a conventional steering wheel.
Figure 7B:
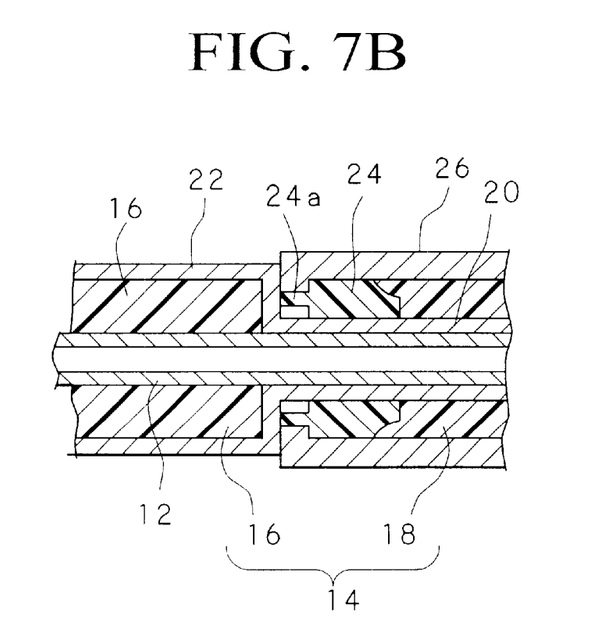
FIG. 7B is a cross-sectional view taken along the line Z—Z in FIG. 7A.

For example, FIGS. 7A and 7B are diagrams disclosed in Japanese Patent Application, First Publication No. Hei 11-34881 and are an example of a conventional method for manufacturing a steering wheel. FIG. 7A is a planar view of a steering wheel, and FIG. 7B is a cross-sectional view taken along line Z—Z shown in FIG. 7A. In the figures, the numeral 12 indicates the metal core bar for the rim which is formed from a steel pipe or the like. In the method for manufacturing the steering wheel in this example, a wood member 16 consisting of a wooden material and/or a hard resin is adhered to metal core bar 12. A coating is performed to wood member 16, while at the same time an adhesive layer 20 is formed over the surface of metal core bar 12. The coating layer 22 on wood member 16 and the adhesive layer 20 on metal core bar 12 consist of the same material. Next, a leather support piece 24 consisting of a hard resin is fixed in place at a site adjacent to the end of wood member 16. A soft sheath 18 is formed onto adhesive layer 20 by injection molding a soft resin. Soft sheath 18 provides the base for the leather wrapping. Leather wrapping layer 26 is formed by wrapping a leather material around soft sheath 18 and leather support piece 24. Both edges of the leather are held in the space above a spacer 24a that is formed between leather support piece 24 and wood member 16.

When manufacturing a steering wheel using this type of method, if there is poor accuracy in the shape of metal core bar 12 so that distortion in metal core bar 12 occurs, it is difficult to attach the preformed hard wood member 16 to the correct position. In order to attach wood member 16 accurately, an approach must be employed in which the distortion in metal core bar 12 is absorbed by increasing the thickness of the adhesive layer for adhering metal core bar 12 and wood member 16. However, this approach is problematic as it leads to higher material costs due to the increased amount of adhesive agent that is used.

Moreover, since the manner of distortion will vary for each metal core bar 12, the application of the adhesive for metal core bar 12 and wood member 16 must be adjusted as required for each case. For this reason, it is not possible to employ a mechanized continuous process. As a result, the manufacturing operation for the steering wheel become complicated and requires more time.

In addition, when determining the positioning for adhering wood member 16 to metal core bar 12, the position is adjusted while observing the disposition of wood member 16 over the entirely of metal core bar 12. Thus, a large jig is required for supporting the entire body including metal core bar 12 and wood member 16. This is inconvenient as it also results in a poorer operability.

SUMMARY OF THE INVENTION

It is therefore the objective of the present invention to resolve at least one of the above-described problems encountered in the manufacture of a steering wheel. Specifically, the present invention aims to enable very efficient manufacture of a steering wheel with a highly accurate shape, even if deformation is present in the metal core bar. The present invention further aims to simplify the manufacturing steps for a steering wheel.

The present invention's steering wheel manufacturing method is provided with a step for preparing a metal core bar, a step for forming a resin layer around the metal core bar to form a core member, a step for preparing a plurality of outer parts, which have a outer surface comprising a designed surface layer and an inner surface made of resin and a step for attaching said plurality of outer parts to the core member.

The core member for the steering wheel in the present invention is achieved by forming a first resin layer around a metal core bar.

In the present invention, a steering wheel is manufactured by forming a first resin layer about a metal core bar to produce a steering wheel core member, and then attaching outer parts to the outside of this steering wheel core member. As a result, the steering wheel core member produced has a highly accurate shape even if there is poor accuracy in the shape of the metal core bar. Accordingly, it is possible to manufacture a steering wheel of a specific shape with good accuracy and high efficiency. In addition, it is possible to reduce the amount of adhesive agent employed as compared to the conventional method in which distortion in the metal core bar is corrected via the adhesive layer. Thus, manufacturing costs are reduced and the adhering step is simplified.

Further, a first engaging member may be formed on a surface of the first resin layer, a second engaging member may by form on inner surface of the outer parts. By engaging the first engaging member with the second engaging member in the step for attaching the outer parts to the core member, positioning of the outer parts and the core member becomes an easy matter. Thus, operability is improved and the need for a large jig is eliminated. The manufacturing process therefore becomes simple. Moreover, depending on the design of the engaging member, it may be possible to reduce the number of parts.

The steering wheel manufactured according to the present invention's manufacturing method has a highly accurate shape, good yield, and a reduced manufacturing cost.

DESCRIPTION OF THE PREFERRED EMBODIMENTS

Figure 1:
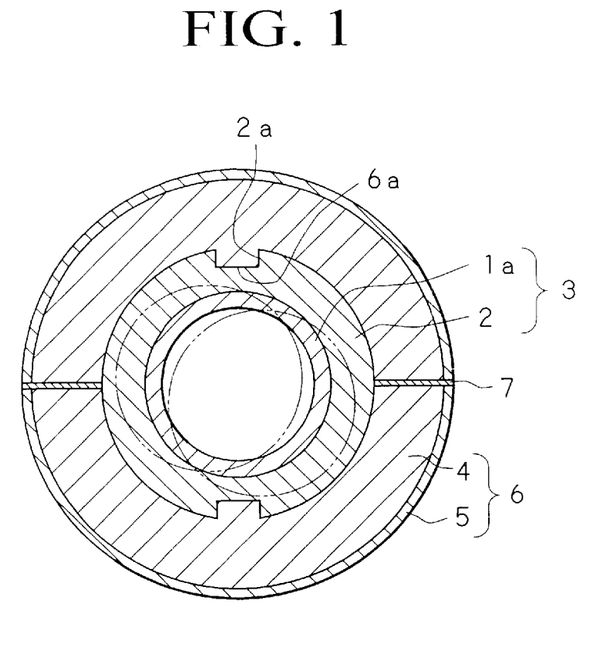
FIG. 1 is a cross-sectional view of the steering wheel according to a first embodiment of the present invention.
Figure 2:
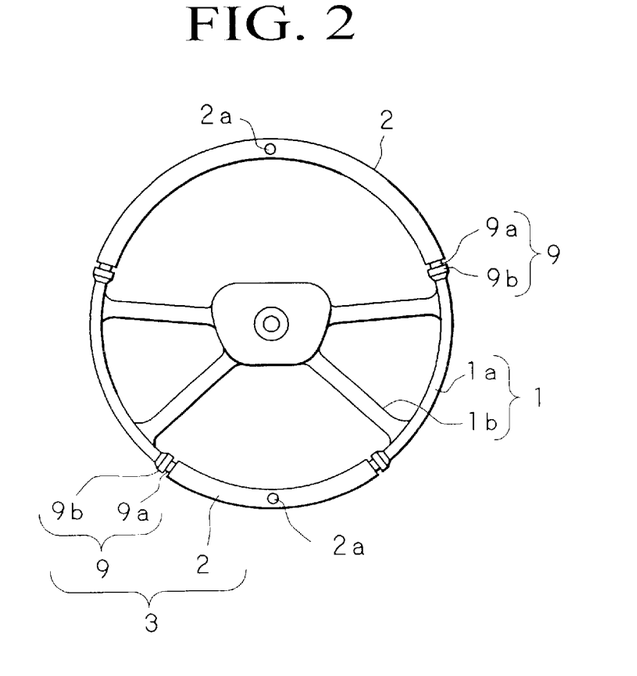
FIG. 2 is a planar view of the core member employed for the steering wheel according to a first embodiment of the present invention.

The present invention will now be described in greater detail. FIGS. 1 and 2 show a first embodiment of the present invention. FIG. 1 is a cross-sectional view of a steering wheel. FIG. 2 is a planar view of the steering wheel core member (hereinafter, referred to simply as "core member"). In the FIGS. 1 indicates a metal core bar, 1a indicates the rim of the metal core bar, 1b indicates the spokes of the metal core bar, 2 indicates the first resin layer, 3 indicates the core member, 4 indicates a second resin layer, 5 indicates a surface layer, 6 indicates the outer parts, and 7 indicates an adhesive layer. In the core member 3 shown in FIG. 2, a first resin layer 2 is formed about the portions of rim 1a of metal core bar 1.

As shown in FIG. 1, the steering wheel according to this embodiment has outer parts 6 consisting of a second resin layer 4 and a surface layer 5. The second resin layer 4 reinforces the surface layer 5.

In core member 3, first resin layer 2 is formed about the portions of rim 1a of metal core bar 1 at which outer parts 6 are attached. The outer surface of the outer parts 6 comprises a designed surface layer, and the inner surface of the outer parts 6 is made of resin.

Metal core bar 1 is formed by welding together rim 1a, which consists of an iron or other such metal pipe, and spokes 1b, which consist of metal pipes or plates.

Rim 1a of metal core bar 1 is not limited to a pipe-shape. Rather, it may have a variety of cross-sectional shapes. For example, rim 1a maybe V-shaped or U-shaped in cross-section. Metal core bar 1 may be formed by die-cast molding a light metal like aluminum or magnesium. In this case, rim 1a and spokes 1b may be formed together.

It is not necessary that the cross-sectional shape of rim 1a be the same across its entire periphery. Rather, rim 1a may assume a cross-sectional shape as suitable to its location.

First resin layer 2 is formed using a synthetic resin, preferable examples of which include polyurethane foam, epoxy resin, ABS resin, PPS (polyphenylene sulfide) resin and the like. In particular, the coefficient of thermal expansion of PPS is on par with that of the metal core bar, making this a preferred choice from the perspective of obtaining a steering wheel having superior resistance to heat and cold.

Depending on the design of the steering wheel, first resin layer 2 may be formed about the entirety of rim 1a of the metal core bar, or to only part of rim 1a, as shown by the example in FIG. 2.

First resin layer 2 has a thickness equivalent to or greater than that necessary to absorb distortion in rim 1a of the metal core bar, such as shown by the alternate long and two short dash lines in FIG. 1 for example.

It is desirable to form first resin layer 2 in a shape that has an engaging member (first engaging member) for engaging with the member that is adjacent to first resin layer 2. In this embodiment, a hole 2a is provided in the outer peripheral surface of first resin layer 2 as an engaging member for engaging with the outer parts 6 that are provided adjacent to first resin layer 2. A projection 6a is provided on the inner surface of outer parts 6, as a second engaging member, for engaging with this hole 2a.

In the case where a portion of the steering wheel rim is formed from a leather wrapping layer, leather stopping members 9 may be formed at the ends of first resin layer 2 that are adjacent to the leather wrapping layer, in a unitary and continuous manner with first resin layer 2, to function as the engaging member between the leather wrapping layer and the first resin layer. The leather stopping members 9 shown in the example in FIG. 2 are formed in a shape that has a groove 9a and flange 9b for holding the edge of the leather therebetween.

While an engaging member for first resin layer 2 and outer parts 6 need not be present, the provision thereof is desirable as it facilitates the easy and sure positioning of first resin layer 2 and outer parts 6. Any shape is acceptable for the engaging member for first resin layer 2 and outer parts 6, provided that it enables positioning by mutual engagement of the members. In addition to the hole and projection as shown in this embodiment, positioning may also be accomplished with a groove and convex strip, or by bringing wall-shaped convexities into mutual contact with one another. In addition, the number and site of provision of the engaging members are optional.

The engaging member for first resin layer 2 and the leather wrapping layer, i.e., leather stopping member 9, may be made as a separate piece from first resin layer 2. However, the number of parts, as well as the number of operational steps, can be reduced by forming the engaging member in a unitary manner with first resin layer 2.

The material employed for outer parts 6 is not particularly restricted. For example, a material preferably used is one in which a second resin layer 4, consisting of foam epoxy resin, polycarbonate, ABS resin, PPS resin or the like, is formed in a unitary manner to the inner surface of surface layer 5, which consists of wood designed board, leather, synthetic resin film or the like. In particular, the coefficient of thermal expansion of PPS resin is on par with that of the metal core bar, making this a desirable choice in view of obtaining a steering wheel having superior resistance to heat and cold.

A preformed member may be employed for outer parts 6. In the example of forming method for outer parts 6, at first performing surface layer 5 using a method suitable for the material, such as hot pressing, vacuum pressing or the like. This preformed surface layer 5 is then placed inside a mold, resin is added to the inside, and molded by the method of injection molding, expansion molding, transfer molding, or compression molding.

The shape of outer parts 6 is not particularly restricted. In this embodiment, outer parts 6 are designed to have a two-part structure consisting of the member that forms the front surface and the member that forms the rear surface of the steering wheel. The member that forms the front surface and the member that forms the rear surface are attached onto first resin layer 2 of the core member 3. An adhesive agent is then employed to adhere together outer parts 6 and first resin layer 2, as well as outer parts 6 to one another, to form a unitary structure. An epoxy resin or urethane resin is preferably employed for the adhesive agent. In the figure, the numeral 7 indicates the adhesive layer between outer parts 6. In addition, although not shown in the figures, an adhesive layer is also interposed between outer parts 6 and first resin layer 2.

When providing a leather wrapping layer, a base (not shown) for this leather wrapping layer is formed about the metal core bar 1 to the portion of core member 3 at which first resin layer 2 is not formed. The leather is then wrapped on this base to form the leather wrapping layer. The shape of this base for the leather wrapping layer is not particularly restricted. The material for forming the base for the leather wrapping layer is not limited. For example, polyurethane foam, elastomer, epoxy foam and soft resin are suitably employed.

The method for manufacturing a steering wheel in the present invention provides for obtaining a steering wheel core member 3 by forming a first resin layer 2 about a rim 1a of a metal core bar 1. Next, outer parts 6 are attached onto first resin layer 2, and a steering wheel is obtained by adhering outer parts 6 to first resin layer 2 to form a unitary structure. It is desirable to perform a suitable coating process on outer parts 6.

When providing a leather wrapping layer to part of the steering wheel rim, first resin layer 2 is formed at a specific site on rim 1a of metal core bar 1. Next, a base for the leather wrapping layer is formed to the area where a first resin layer 2 has not been formed. The leather is wrapped over the base, to form the leather wrapping layer. In addition, outer parts 6 are attached to first resin layer 2, and are adhered thereto in a unitary manner to obtain a steering wheel. Note that it is acceptable to perform either the step for forming the base for the leather wrapping layer or the step for attaching outer parts 6 to first resin layer 2 first.

If the same material is employed to form the leather wrapping layer base and first resin layer 2, then it is possible to form these two members simultaneously.

In the present embodiment, an arrangement is employed for core member 3 in which a first resin layer 2 is formed about rim 1a of metal core bar 1, and outer parts 6 are attached onto first resin layer 2. As a result, even if a slight deformation occurs in metal core bar 1, the outer shape of first resin layer 2 is always the same. Thus, there is no distortion in the shape of core member 3, so that there is high accuracy in the final product's shape. Accordingly, the attachment of a preformed outer parts 6 is easy and certain, and it is not necessary to adjust positioning for each final product. In addition, the amount of adhesive agent employed between core member 3 and outer parts 6 can be limited to a minimal amount. Thus, costs are reduced, the production process is simplified, and operational efficiency is improved.

A hole 2a is provided in first resin layer 2 as the engaging member with outer parts 6. By engaging a projection 6a on outer parts 6 in this hole 2a, the positioning of outer parts 6 can be carried out easily. Thus, a large jig is not necessary.

Since a leather stopping member 9 can be formed to both ends of first resin layer 2 in a unitary manner as a member for engaging with the leather wrapping layer, the trouble of producing and attaching this leather stopping member 9 as a separate part can be eliminated. Thus the number of parts can be reduced.

Since it is also possible to form first resin layer 2 and the base for the leather wrapping layer simultaneously, it is possible to still further reduce the number of manufacturing steps, thereby improving production efficiency.

Note that the preceding embodiment showed an example in which the steering wheel rim was comprised of a leather wrapping layer and outer parts 6 provided with a designed surface layer 5. However, the steering wheel according to the present invention is not limited to this design. Rather, a variety of designs may be employed.

For example, it is also acceptable for the entire rim of the steering wheel to consist of outer parts 6, with no leather wrapping layer provided. In this case, first resin layer 2 is formed about the entirety of rim 1a of metal core bar 1, to form core member 3. Outer parts 6 are then attached to first resin layer 2 to obtain the steering wheel.

It is also acceptable to form first resin layer 2 not only onto rim 1a of metal core bar 1, but also to spokes 1b, and then to attach the outer parts to the outside of this. Alternatively, first resin layer 2 may be formed onto rim 1a of metal core bar 1, while at the same time, resin molding, which forms the final design surface, is carried out onto spokes 1b.

Figure 3:
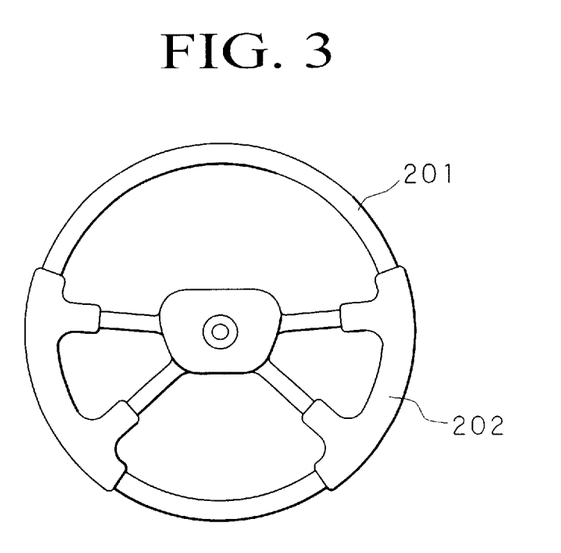
FIG. 3 is a planar view of the core member employed for the steering wheel according to a second embodiment of the present invention.

FIG. 3 shows a second embodiment of the present invention. In the steering wheel according to this embodiment, outer parts are attached to part of the rim of the steering wheel, while the remainder of the rim is formed of a resin molded product. FIG. 3 shows an arrangement in which a first resin layer 201 is formed to a specific site on the rim of the metal core bar, and a molded rim 202 is formed to the remaining portion. This molded rim 202 consists of resin. A finishing process maybe performed to the outer surface of molded rim 202 as needed, to form the final design surface of the steering wheel. Also, a designed layer can be attached to the molded rim 202 to form the final design surface. First resin layer 201 and molded rim 202 may be formed simultaneously using the same material. Examples of preferred materials that may be employed for first resin layer 201 and molded rim 202 include elastomer, polyurethane foam, ABS, epoxy foam, PPS resin and the like. Further, although not shown in the figures, it is desirable to provide an engaging member to first resin layer 201 for engaging with the outer parts (not shown).

The outer parts (not shown) are attached to first resin layer 201, and adhered to form a unitary structure, thereby obtaining the steering wheel.

As in the case of the first embodiment, this embodiment enables the easy and sure attachment of the outer parts even if there slight distortion is present in the metal core bar. Moreover, as a result of this embodiment, it is possible to reduce the number of manufacturing steps and keep material costs low. Thus, this embodiment is beneficial in providing a reduction in manufacturing costs.

EXAMPLES

The present invention will now be explained below using specific examples. However, the present invention is not limited thereto.

Example 1

Figure 4:
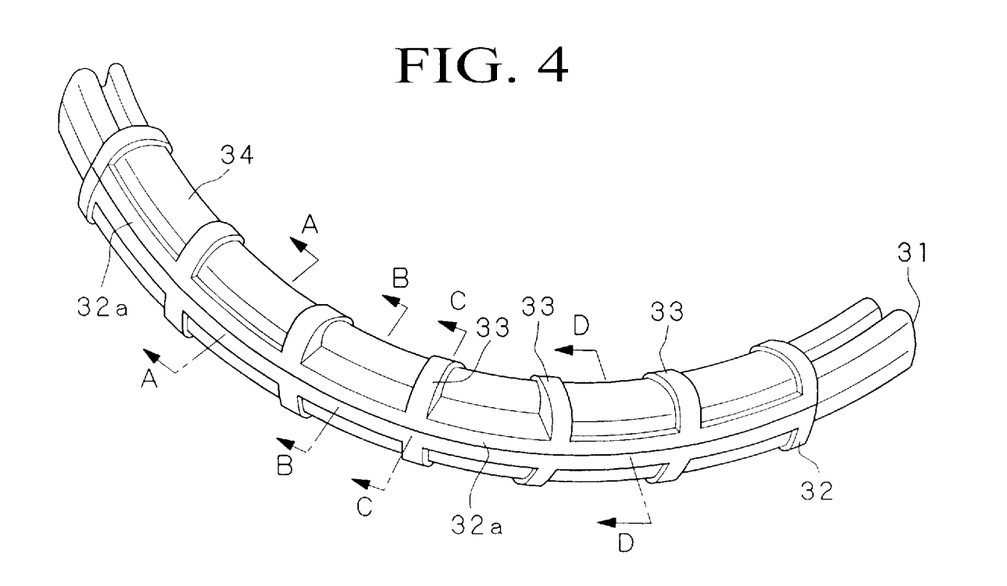
FIG. 4 is a perspective view of the core member employed for the steering wheel in an example according to the present invention.
Figure 5:
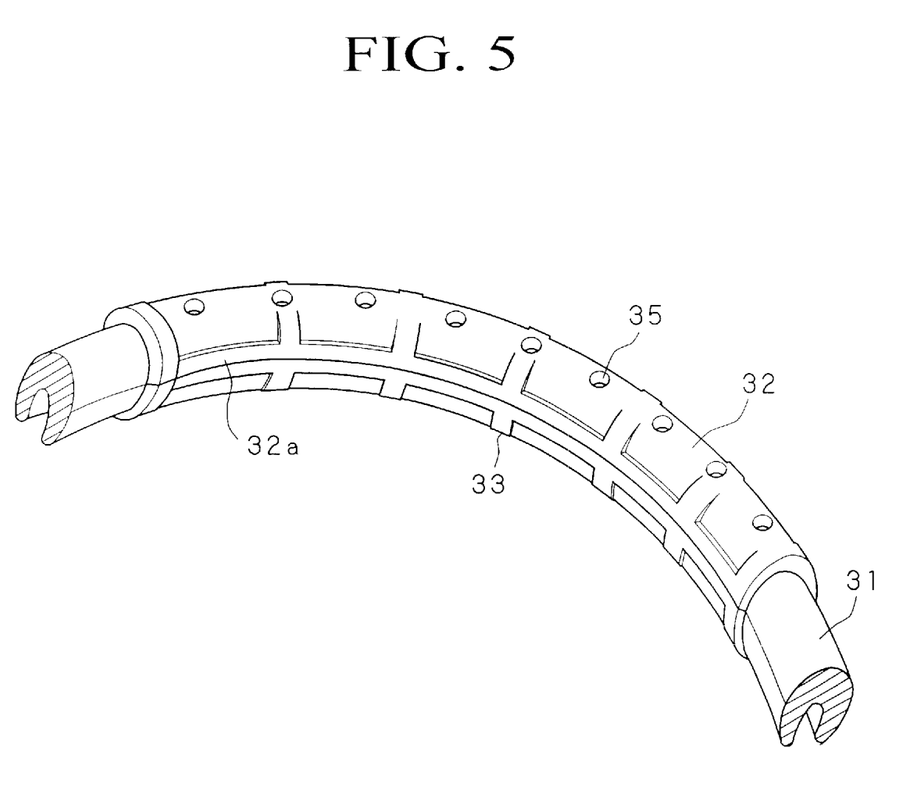
FIG. 5 is a perspective view of the arrangement in which the core member in FIG. 4 has been turned over.
Figure 6A:
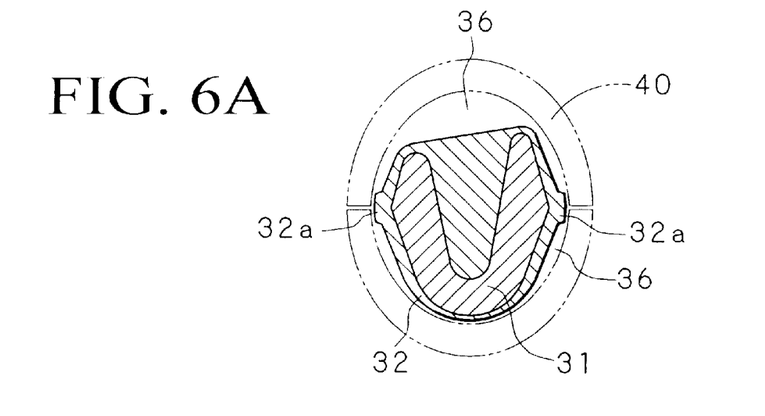
FIG. 6A is a cross-sectional view taken along the lines A—A and D—D in FIG. 4.
Figure 6B:
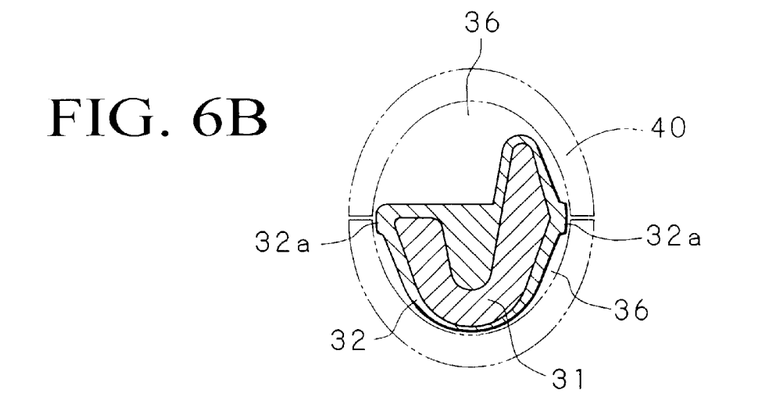
FIG. 6B is a cross-sectional view taken along the line B—B in FIG. 4.
Figure 6C:
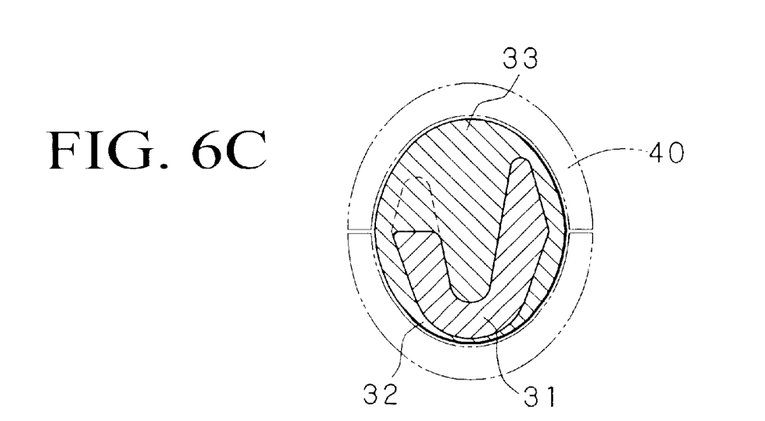
FIG. 6C is a cross-sectional view taken along the line C—C in FIG. 4.

FIGS. 4–6 show part of the rim of the core member according to Example 1 of the present invention. FIG. 4 is a perspective view. FIG. 5 is a perspective view showing the reverse side of the portion pictured in FIG. 4. FIG. 6A is a cross-sectional view along the lines A—A and D—D in FIG. 4. FIG. 6B is a cross-sectional view along the line B—B in FIG. 4. FIG. 6C is a cross-sectional view along the line C—C in FIG. 4. Numerals 31 and 32 indicate the metal core bar and the first resin layer, respectively. Outer parts 40 are indicated by the alternate long and two short dash lines in FIG. 6.

First, metal core bar 31 for the steering wheel was formed by die-cast molding using magnesium. The rim of metal core bar 31 was U-shaped in cross section as shown in FIGS. 4 and 5. The open end of the U-shape of metal core bar 31 was the upper portion, while the curved end was the bottom portion. The cross-sectional shape of metal core bar 31 was not constant across the entirety of the rim. Rather, depending on the location, the cross-sectional shape of metal core bar 31 may be approximately J-shaped, as shown in FIGS. 6B and 6C. At its largest part, metal core bar 31 had a width of 15.0 mm in the direction of the diameter of the steering wheel overall (hereinafter, referred to as the "horizontal direction"), and a height of 17.0 mm in the direction of the thickness of the steering wheel (hereinafter, referred to as the "vertical direction") . The distortion in metal core bar 31 of this rim was 0.5 mm in the horizontal direction and 0.5 mm in the vertical direction.

Next, metal core bar 31 was placed in a forming mold, epoxy resin was poured into the forming mold, and a first resin layer 32 was molded about metal core bar 31 to obtain a core member. The shape of the inner surface of the forming mold, i.e., the shape of the outer surface of core member 32, was such that adhered parts 33, which are elliptical in cross-section, are provided with spacing therebetween as shown in FIG. 6C, and the cross-sectional shape between adhered parts 33, 33 was such that as shown in FIGS. 6A and 6B. That is the cross-sectional shape of core member 32 in FIGS. 6A and 6B was such that the portions of periphery of elliptical were cut out in suitable shapes respectively.

A plurality of cylindrical projections was provided to sites on the inner surface of the forming mold that come in contact with the bottom part of metal core bar 31, for supporting metal core bar 31 so that it is disposed to a specific site in the middle of the forming mold. As a result, as shown in FIG. 5, a plurality of cylindrical holes 35 were formed in the outer surface of first resin layer 32 on the bottom part of the core member that extended through to metal core bar 31.

At its largest part, i.e., at adhered parts 33, the core member obtained by forming first resin layer 32 in this way had a width of 18.0 mm in the horizontal direction and a height of 25.0 mm in the vertical direction. Moreover, there was no distortion in the core member, so that the rim was level.

Outer parts 40 were formed in another process. The outer shell portion of the steering wheel was divided into a steering wheel front surface part and a rear surface part, i.e., the upper portion and the lower portion of the core member, such that these outer parts 40 were approximately semicircular in cross-section.

For the surface layer, a plastic film, in which a wood pattern was printed onto a transparent acrylic resin film and a vinyl chloride resin was coated on top of this printed surface, was prepared. This plastic film was premolded in a vacuum press into the shape of a semicircular arch in cross-section and so that the acrylic resin layer would be on the outside. The premolded product was then placed in a mold that was in the shape of an approximately semicircular cylinder in cross-section, and ABS resin was injection molded onto the inner surface of the vinyl chloride resin layer, to form the second resin layer. In this way, outer parts 40 having a thickness of 3 mm was obtained. In addition, a number of cylindrical projections (not shown), for engaging in holes 35 formed in the outer surface of the bottom portion of the core member, were formed, when the second resin layer is formed to the inner surface of one of the outer parts 40 that is disposed on the bottom portion of the core member.

Outer parts 40 were attached to the upper and lower portions of the core member respectively, and an epoxy resin was used to adhere the core member and outer parts 40 together, as well as to adhere upper and lower outer parts 40 together, thereby obtaining the steering wheel.

Even if deformation occurs in the metal core bar 31 of this example, there is no distortion in the core member following molding of first resin layer 32. Thus, it is possible to manufacture a steering wheel with excellent accuracy and efficiency. Moreover, positioning of outer parts 40 and the core member can be carried out easily due to the provision of cylindrical projections to the inner surface of outer parts 40 and holes 35 to the outer surface of the lower part of the core member. As a result, this example offers excellent operability and does not require a large size jig for positioning.

Further, as shown in FIG. 6C, in adhered parts 33 of the core member in this example, the outer surface of the core member and the inner surface of the outer parts 40 are adhered together without an interval of spacing therebetween. In addition, as shown in FIGS. 6A and 6B, the outer surface of the core member and the inner surface of the outer parts 40 are adhered together only at center portion 32a in the vertical direction in the space between two adjacent adhered parts 33. Spaces 36 are formed between the outer surface of the core member and the inner surface of the outer parts 40 at the upper and lower parts thereof. Such spaces 36 serve to accommodate the thermal expansion of first resin layer 32. Thus, it is possible to prevent stress arising from changes in humidity from acting on outer parts 40 and causing deformation. Further, excess adhesive agent that is applied when adhering the core member and outer parts 40 flows into spaces 36, so that leaking of the adhesive agent can be prevented. Moreover, the structure having such space 36 is also desirable from the perspective of preventing sinking when forming first resin layer 32.

Example 2

The shape of the core member in this example is the same as that in Example 1, with the exception that the metal core bar of the rim is V-shaped in cross-section. At its largest part, the metal core bar of the rim had a width of 16.0 mm in the horizontal direction and a height of 20.0 mm in the vertical direction. The distortion in this metal core bar 31 of the rim was 0.5 mm in the horizontal direction and 0.5 mm in the vertical direction.

This metal core bar was placed in the forming mold, polyurethane foam was molded by RIM molding, and a first resin layer was molded about the metal core bar to obtain the core member. A number of holes were formed in the outer surface of the bottom portion of this core member in the same manner as in Example 1.

At its largest part, the core member formed in this way had a width of 18.0 mm in the horizontal direction and a height of 25.0 mm in the vertical direction. There was no distortion in this core member, so that the rim was level.

The outer parts were formed in another process. The outer parts had the same semi-circular cylindrical shape in cross-section as that of the outer parts in Example 1.

For the surface layer, a bird's eye maple material was employed as the superficial layer, with aluminum sheet and a birch material then applied sequentially thereto, to form a three-layer designed member. This wooden three-layer designed material was premolded by hot pressing into a semi-circular arch shape in cross section, so that the superficial layer was on the outside, and then set into a mold shaped to be roughly a semicircular cylindrical shape in cross-section. Polycarbonate was injection molded inside this mold, to form a second resin layer. In this manner, outer parts having a thickness of 3 mm was obtained. In addition, when forming the second resin layer, a plurality of cylindrical projections were formed to the inner surface of one of the outer parts that is disposed to the bottom part of the core member, these cylindrical projections engaging with holes that are formed in the outer surface of the bottom part of the core member.

Respective outer parts are attached to the upper and lower parts of the core member, and a urethane resin is employed to adhere the core member and the outer parts together, and to adhere together the outer parts for the upper and lower parts. In this way, a steering wheel was obtained.

Example 3

A round pipe made of iron was welded together to form the metal core bar for the steering wheel. The diameter of the round pipe composing the metal core bar of the rim was 13.0 mm. The distortion in the rim was 1.0 mm in the horizontal direction and 1.0 mm in the vertical direction.

This metal core bar was placed in a forming mold that was approximately circular in cross-section, ABS resin was injection molded, and a first resin layer was formed around the metal core bar to obtain the core member. The shape of the outer surface of the core member was approximately circular, with a constant cross-sectional shape across the entirety of the rim. When forming the first resin layer, a plurality of engaging grooves having a depth of 1.5 mm, a width of 3.0 mm and a length of 5.0 mm were formed to the outer surface of the upper and lower parts of the core member, along the circumferential direction of the rim.

The diameter of the core member formed in this way was 18.0 mm. No distortion was present, so that the rim was in the horizontal plane.

Outer parts that were roughly semicircular in cross-section were formed in another process. A designed member, in which a claro walnut material employed as the superficial layer was backed with non-woven cloth, was prepared. This wood designed material was preformed in a vacuum press into a shape that was roughly a semicircular arch in cross-section, and so that the superficial layer was on the outside. This preformed product was then placed inside a mold that was in the shape of a semicircular cylinder in cross-section, epoxy resin was foam molded into the mold, forming the second resin layer. In this way, outer parts having a thickness of 4 mm was obtained.

When forming the second resin layer, convex strips were formed to the inner surface of the outer parts for engaging in engaging grooves formed in the outer surface of the core member.

Respective outer parts were attached to the upper and lower parts of the core member, and an epoxy resin was employed to adhere the core member and the outer parts together, and to adhere together the outer parts for the upper and lower parts, thereby obtaining the steering wheel.

Even if deformation in the metal core bar occurred in this example, there was no distortion in the core member following molding of the first resin layer. Thus, it was possible to manufacture the steering wheel with excellent accuracy and efficiency. Moreover, due to the convex strips provided in the inner surface of the outer parts and the engaging grooves provided in the outer surface of the core member, it is possible to carry out positioning of the outer parts and the core member easily. Thus, operability is excellent and a large jig for positioning is unnecessary.

Example 4

A round pipe made of iron was welded together to form the metal core bar for the steering wheel. The diameter of the round pipe composing the metal core bar of the rim was 13.0 mm. The distortion in the rim was 1.0 mm in the horizontal direction and 1.0 mm in the vertical direction.

This metal core bar was placed in a forming mold that was approximately circular in cross-section, PPS (polyphenylene sulfide) was injection molded, and a first resin layer was formed around the metal core bar to obtain the core member. The shape of the outer surface of the core member was approximately circular, with a constant cross-sectional shape across the entirety of the rim. When forming the first resin layer, a plurality of engaging grooves having a depth of 1.5 mm, a width of 3.0 mm, and a length of 5.0 mm were formed to the outer surface of the upper and lower parts of the core member, along the circumferential direction of the rim.

The diameter of the core member formed in this way was 18.0 mm. No distortion was present, so that the rim was level.

Outer parts that were roughly semicircular in cross-section were formed in another process. A designed member was prepared for the surface layer in which a claro walnut material was employed as the superficial layer, and another claro walnut material was laminated with aluminum foil interspersed therebetween. This wood designed material was preformed in a vacuum press into a shape that was roughly a semicircular arch in cross-section, and so that the superficial layer was on the outside. This preformed product was then placed inside a mold that was in the shape of a semicircular cylinder in cross-section, PPS resin was injection molded into the mold, forming the second resin layer. In this way, outer parts having a thickness of 3 mm was obtained.

When forming the second resin layer, convex strips were formed to the inner surface of the outer parts for engaging in engaging grooves formed in the outer surface of the core member.

Respective outer parts were attached to the upper and lower parts of the core member, and an epoxy resin was employed to adhere the core member and the outer parts together, and to adhere together the outer parts for the upper and lower parts, thereby obtaining the steering wheel.

Even if deformation in the metal core bar occurred in this example, there was no distortion in the core member following molding of the first resin layer. Thus, it was possible to manufacture the steering wheel with excellent accuracy and efficiency. Moreover, due to the convex strips provided in the inner surface of the outer parts and the engaging grooves provided in the outer surface of the core member, it is possible to carry out positioning of the outer parts and the core member easily. Thus, operability is excellent and a large jig for positioning is unnecessary.

Moreover, in this example specifically, the first resin layer has a coefficient of thermal expansion that is on par with that of the metal core bar. Thus, a steering wheel can be obtained that has excellent resistance to heat and cold.

Although the invention has been described in detail herein with reference to its preferred embodiments and certain described alternatives, it is to be understood that this description is by way of example only, and it is not to be construed in a limiting sense. It is further understood that numerous changes in the details of the embodiments of the invention, and additional embodiments of the invention, will be apparent to, and may be made by, persons of ordinary skill in the art having reference to this description. It is contemplated that all such changes and additional embodiments are within the spirit and true scope of the invention as claimed.

What is claimed:

1. A steering wheel comprising:

a metal core;

a resin layer formed on said metal core;

a plurality of projection portions extending outwardly from said resin layer so as to define gaps between said projection portions;

an outer part surrounding at least a portion of said resin layer, a portion of said outer part being attached to said projection portions and covering said gaps so as to define open spaces between said resin layer and said outer part at the location of said gaps, the portion of said outer part extending over said gaps and defining said open spaces not having any holes formed therein.

2. A steering wheel according to claim 1, wherein said outer part comprises a plurality of components.

3. A steering wheel according to claim 1, wherein said projection portions extend annularly around said metal core.

4. A steering wheel according to claim 1, wherein said projection portions are integral with said core.

5. A steering wheel according to claim 4, wherein said projection portions are formed of the same material as said resin layer.

6. A steering wheel according to claim 1, wherein said outer part consists of two components which have a semi-circular or semi-ellipsoid cross section.

7. A steering wheel according to claim 1, further comprising:

at least one hole formed on a surface of said resin layer; and at least one convex portion which is formed on an inner surface of said outer part and engages said hole.

8. A steering wheel according to claim 1, wherein said plurality of projection portions are formed on at least part of an outer surface of a cross section of said resin layer and said plurality of projection portions constitute adhered parts with spacing there between along the axis of said core.

9. A steering wheel according to claim 1, wherein said outer part is rigid.

* * * * *